(12) United States Patent
Kameo et al.

(10) Patent No.: US 8,084,540 B2
(45) Date of Patent: Dec. 27, 2011

(54) PROPYLENE-BASED RESIN COMPOSITION AND MOLDED ARTICLE THEREOF

(75) Inventors: Koji Kameo, Ichihara (JP); Mitsuyoshi Shimano, Kimitsu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 70 days.

(21) Appl. No.: 12/739,105

(22) PCT Filed: Oct. 24, 2008

(86) PCT No.: PCT/JP2008/069825
§ 371 (c)(1), (2), (4) Date: May 14, 2010

(87) PCT Pub. No.: WO2009/054548
PCT Pub. Date: Apr. 30, 2009

(65) Prior Publication Data
US 2010/0261843 A1    Oct. 14, 2010

(30) Foreign Application Priority Data

Oct. 26, 2007 (JP) ................. 2007-278610

(51) Int. Cl.
*C08L 67/02* (2006.01)

(52) U.S. Cl. .................... 525/165; 525/166; 525/176

(58) Field of Classification Search ............ 525/166, 525/167, 176
See application file for complete search history.

(56) References Cited

U.S. PATENT DOCUMENTS

| | | | | |
|---|---|---|---|---|
| 6,110,849 A * | 8/2000 | Tsai et al. | ................ | 442/394 |
| 2007/0160861 A1 * | 7/2007 | Shinoda et al. | ............ | 428/522 |
| 2008/0311320 A1 * | 12/2008 | Hiruma et al. | ............ | 428/34.9 |
| 2009/0099313 A1 * | 4/2009 | Uradnisheck | ............ | 525/221 |
| 2010/0273959 A1 * | 10/2010 | Miyake et al. | ............ | 525/92 R |
| 2011/0195210 A1 * | 8/2011 | Li et al. | ............ | 428/35.7 |

FOREIGN PATENT DOCUMENTS

JP    2005-171139 A    6/2005
JP    2007-106843 A    4/2007

* cited by examiner

*Primary Examiner* — Bernard Lipman
(74) *Attorney, Agent, or Firm* — Sughrue Mion, PLLC

(57) ABSTRACT

There is provided a propylene-based resin composition containing 10 to 89% by mass of a propylene-based polymer (A) (excluding a modified propylene-based polymer (C) defined below), 10 to 89% by mass of a polylactic acid-based resin (B), and 1 to 80% by mass of a modified propylene-based polymer (C) which is an α,β-unsaturated glycidyl ester-grafted propylene-based polymer having an α,β-unsaturated glycidyl ester-derived structural unit content of 0.1% by mass or more and less than 1.0% by mass, provided that each of the contents of the propylene-based polymer (A), the polylactic acid-based resin (B) and the modified propylene-based polymer (C) is an amount based on the total amount of the three components.

3 Claims, No Drawings

PROPYLENE-BASED RESIN COMPOSITION AND MOLDED ARTICLE THEREOF

CROSS REFERENCE TO RELATED APPLICATIONS

This application is a National Stage of International Application No. PCT/JP2008/069825 filed Oct. 24, 2008, claiming priority based on Japanese Patent Application No. 2007-278610, filed Oct. 26, 2007, the contents of all of which are incorporated herein by reference in their entirety.

TECHNICAL FIELD

The present invention relates to a propylene-based resin composition and a molded article thereof, and more particularly to a propylene-based resin composition which is excellent in rigidity and heat resistance and a molded article thereof.

BACKGROUND ART

Use of polylactic acid-based resin, which is produced from plants, has recently been investigated with consideration for influences to the global environment.

For example, JP 2007-106843 A discloses a lactic acid-based resin composition containing a lactic acid-based resin, a polypropylene-based resin and an epoxidized polyolefin, which composition was developed in order to provide a lactic acid-based resin composition from which a molded article excellent in weld strength can be produced. However, there are requests for improvement of the lactic acid-based resin composition of the document in rigidity and heat resistance.

DISCLOSURE OF THE INVENTION

An object of the present invention is to provide a propylene-based resin composition excellent in rigidity and heat resistance and a molded article thereof.

The present invention provides a propylene-based resin composition and a molded article thereof, the composition containing 10 to 89% by mass of a propylene-based polymer (A) (excluding a modified propylene-based polymer (C) defined below), 10 to 89% by mass of a polylactic acid-based resin (B), and 1 to 80% by mass of a modified propylene-based polymer (C) which is an $\alpha,\beta$-unsaturated glycidyl ester-grafted propylene-based polymer having an $\alpha,\beta$-unsaturated glycidyl ester-derived structural unit content of 0.1% by mass or more and less than 1.0% by mass, provided that each of the contents of the propylene-based polymer (A), the polylactic acid-based resin (B) and the modified propylene-based polymer (C) is an amount based on the total amount of the three components.

MODE FOR CARRYING OUT THE INVENTION

The propylene-based resin composition of the present invention contains a propylene-based polymer (A), a polylactic acid-based resin (B), and a modified propylene-based polymer (C) having a predetermined composition.

[Propylene-Based Polymer (A)]

The propylene-based polymer (A) contained in the propylene-based resin composition of the present invention (henceforth, referred to also as component (A)) is a polymer having propylene-derived monomer units. At least one member selected from the group consisting of propylene homopolymers and propylene-ethylene copolymers is used as the propylene-based polymer (A). It is noted that the propylene-based polymer (A) fails to include the modified propylene-based polymer (C) which is defined below.

Examples of propylene-ethylene copolymers for use as the propylene-based polymer (A) include propylene-ethylene random copolymers and propylene-ethylene block copolymers. The propylene-ethylene block copolymers are copolymers each composed of a propylene homopolymer portion and a propylene-ethylene random copolymer portion.

Propylene homopolymers or propylene-ethylene block copolymers are preferred as the propylene-based polymer (A) from the viewpoint of rigidity, heat resistance or hardness.

The isotactic pentad fraction, as measured by $^{13}$C-NMR, of a propylene homopolymer preferably is 0.95 or more, and more preferably is 0.98 or more.

The isotactic pentad fraction, as measured by $^{13}$C-NMR, of the propylene homopolymer portion of a propylene-ethylene block copolymer preferably is 0.95 or more, and more preferably is 0.98 or more.

The isotactic pentad fraction is a fraction of propylene monomer units which are present at the center of an isotactic chain in the form of a pentad unit, in other words, the center of a chain in which five propylene monomer units are meso-bonded successively, in the molecular chain of propylene-based polymer as measured by a method reported in A. Zambelli et al., Macromolecules, 6, 925 (1973), namely, by use of $^{13}$C-NMR spectrum. NMR absorption peaks are assigned in accordance with the disclosure of Macromolecules, 8, 687 (1975). Specifically, the isotactic pentad fraction is a ratio of the mmmm peak area to the total absorption peak area in the methyl carbon ranges observed in a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

The intrinsic viscosity, as measured in Tetralin solvent of 135° C., of each of a propylene homopolymer, the propylene homopolymer portion of a propylene-ethylene block copolymer, and a propylene-ethylene random copolymer preferably is 0.7 to 5 dl/g, and more preferably is 0.8 to 4 dl/g.

The molecular weight distribution (Mw/Mn), as determined by gel permeation chromatography, which may henceforth be abbreviated as GPC, of each of a propylene homopolymer, the propylene homopolymer portion of a propylene-ethylene block copolymer, and a propylene-ethylene random copolymer preferably is 3 to 7.

The ethylene unit content of the propylene-ethylene random copolymer portion contained in a propylene-ethylene block copolymer preferably is 20 to 65% by mass, and more preferably is 25 to 50% by mass.

The intrinsic viscosity, as measured in Tetralin solvent of 135° C., of the propylene-ethylene random copolymer portion of a propylene-ethylene block copolymer preferably is 1.5 to 12 dl/g, and more preferably is 2 to 8 dl/g.

The propylene-ethylene random copolymer portion content of a propylene-ethylene block copolymer preferably is 10 to 60% by mass, and more preferably is 10 to 40% by mass.

The melt flow rate (henceforth abbreviated as MFR), as measured at a temperature of 230° C. under a load of 2.16 kgf in accordance with JIS K7210 (1995), of the propylene homopolymer preferably is 0.1 to 400 g/10 minutes, and more preferably is 1 to 300 g/10 minutes.

The MFR, as measured at a temperature of 230° C. under a load of 2.16 kgf in accordance with JIS K7210 (1995), of the propylene-ethylene copolymer preferably is 0.1 to 200 g/10 minutes, and more preferably is 1 to 150 g/10 minutes.

Methods which can be used for the production of the propylene-based polymer (A) and which may be chosen depending upon the monomer composition of the polymer to be produced include a method including homopolymerizing propylene in the presence of a Ziegler-Natta catalyst or a metallocene catalyst, and a method including copolymerizing propylene with one or more olefins selected from among olefins other than propylene in the presence of a Ziegler-Natta catalyst or a metallocene catalyst. Such a Ziegler-Natta catalyst may be a catalyst system containing a titanium-containing solid transition metal component and an organic metal component. Examples of a metallocene catalyst include catalyst systems containing a compound of a transition metal of any of IV to VI Groups of the periodic table having at least one cyclopentadienyl skeleton and a cocatalyst component.

Examples of a polymerization method include slurry polymerization, gas phase polymerization, bulk polymerization, solution polymerization, and methods composed of appropriate combinations of the aforesaid polymerization techniques. These polymerization methods may be conducted either in a batch system or in a continuous system and either in single stage polymerization or in multi-stage polymerization.

[Polylactic Acid-based Resin]

The polylactic acid-based resin (B) that the propylene-based resin composition of the present invention contains (henceforth, sometimes referred to as component (B)) is a resin composed of a polymer composed only of a repeating unit derived from L-lactic acid and/or D-lactic acid, a resin composed of a copolymer composed of a repeating unit derived from L-lactic acid and/or D-lactic acid and a repeating unit derived from a monomer other than both L-lactic acid and D-lactic acid, or a resin composed of a mixture of a polymer composed only of a repeating unit derived from L-lactic acid and/or D-lactic acid and a copolymer composed of a repeating unit derived from L-lactic acid and/or D-lactic acid and a repeating unit derived from another monomer. The repeating unit derived from L-lactic acid and the repeating unit derived from D-lactic acid are sometimes referred to as an L-lactic acid-derived repeating unit and a D-lactic acid-derived repeating unit, respectively. The monomer other than both L-lactic acid and D-lactic acid includes hydroxycarboxylic acids, such as glycolic acid, aliphatic polyhydric alcohols, such as butanediol, and aliphatic polycarboxylic acids, such as succinic acid. The polylactic acid-based resin (B) can be produced by, for example, a method including dehydration polycondensing lactic acid (L-lactic acid, D-lactic acid, or a mixture of L-lactic acid and D-lactic acid) and, according to necessity, other monomers, a method including ring-opening polymerizing a cyclic dimer of lactic acid (namely, lactide), a method including ring-opening polymerizing lactide and a cyclic bimolecular condensate of lactic acid and a hydroxycarboxylic acid other than lactic acid, or a method including ring-opening polymerizing lactide and/or a cyclic bimolecular condensate of lactic acid and a hydroxycarboxylic acid other than lactic acid, and, according to necessity, a cyclic dimer of a hydroxycarboxylic acid other than lactic acid (e.g., glycolide) or a cyclic ester derived from a hydroxycarboxylic acid (e.g., ε-caprolactone).

When the component (B) contains a polymer containing both an L-lactic acid-derived repeating unit and a D-lactic acid-derived repeating unit, the content of the L-lactic acid-derived repeating unit or the content of the D-lactic acid-derived repeating unit in the polymer is preferably 80 mol % or more, more preferably 90 mol % or more, and even more preferably 95 mol % or more from the viewpoint of the heat resistance of a propylene-based resin composition.

The weight average molecular weight (henceforth, referred to as Mw) of the polylactic acid-based resin (B) is preferably 10,000 to 1000,000, and more preferably 50,000 to 500,000. The molecular weight distribution (henceforth, sometimes referred to as Mw/Mn) of the polylactic acid-based resin (B) is preferably 1 to 4. Sign Mn represents a number average molecular weight. Molecular weights Mw, Mn and molecular weight distribution are measured by GPC using standard polystyrenes as molecular weight standard substances.

[Modified Propylene-based Polymer (C)]

The modified propylene-based polymer (C) (henceforth, referred to as component (C)) that the propylene-based resin composition of the present invention contains is an α,β-unsaturated glycidyl ester-grafted propylene-based polymer having an α,β-unsaturated glycidyl ester-derived structural unit content of 0.1% by mass or more and less than 1.0% by mass. That is, it is a polymer obtained by graft polymerizing a prescribed amount of an α,β-unsaturated glycidyl ester to a propylene-based polymer.

Examples of the α,β-unsaturated glycidyl ester include glycidyl methacrylate and glycidyl acrylate, and glycidyl methacrylate is preferable.

The content of the α,β-unsaturated glycidyl ester-derived structural units contained in the modified propylene-based polymer (C) is usually 0.1% by mass or more and less than 1.0% by mass, and preferably 0.5% by mass or more and less than 1.0% by mass. The content of the α,β-unsaturated glycidyl ester-derived structural units is measured by an infrared-spectrum method.

The MFR, as measured at a temperature of 230° C. under a load of 2.16 kgf in accordance with JIS K7210 (1995), of the modified propylene-based polymer (C) preferably is 0.1 to 300 g/10 minutes, and more preferably is 0.5 to 80 g/10 minutes.

An example of the method for producing the modified propylene-based polymer (C) is a method in which a propylene-based polymer and an α,β-unsaturated glycidyl ester are melt-kneaded by using a mixer, an extruder, or the like.

Examples of the propylene-based polymer to be used for the production of the modified polypropylene-based polymer include polymers that can be used as the aforementioned propylene-based resin (A) and the details thereof are as described above.

As to the contents of components (A), (B) and (C) in the propylene-based resin composition of the present invention, the content of component (A) is 10 to 80% by mass, the content of component (B) is 10 to 80% by mass, and the content of component (C) is 1 to 80% by mass, wherein the sum total of the contents of components (A), (B) and (C) is 100% by mass. From the viewpoint of the rigidity and the heat resistance of a product, it is preferable that the content of component (A) be 10 to 50% by mass, the content of component (B) be 10 to 50% by mass, and the content of component (C) be 5 to 80% by mass.

The propylene-based resin composition of the present invention may contain additional components in addition to the above-mentioned essential components (A), (B), and (C). Examples of such additional components include antioxidants, weather resistance improvers, nucleating agents, flame retardants, plasticizers, lubricants, antistatic agents, colorants, organic fillers, inorganic fillers, elastomers, and resins.

Examples of the inorganic fillers include glass fiber, carbon fiber, metal fiber, glass beads, mica, calcium carbonate, titanium oxide, zinc oxide, potassium titanate whisker, talc, kaolinite, bentonite, smectite, sepiolite, wollastonite, montmorillonite, clay, allophane, imogolite, fibrous magnesium oxysulfate, barium sulfate, glass flakes, and carbon black.

The average particle diameter of an inorganic filler in the form of particles is usually 0.01 to 50 μm, preferably 0.1 to 30 μm, and more preferably 0.1 to 5 μm. The average particle diameter of an inorganic filler means a 50% equivalent particle diameter D50 which is determined from an integral distribution curve of the sub-sieve method which is measured by suspending the inorganic filler in a dispersing medium, such as water and alcohol, by means of a centrifugal sedimentation type particle size distribution analyzer.

The elastomer includes a rubber, which is a substance having crosslinking points in its molecules, and a thermoplastic elastomer, which is a substance with its molecules restrained by molecular groups of hard layers in molecules. The melt flow rate, as measured at a temperature of 190° C. and a load of 2.16 kgf in accordance with JIS K7210 (1995), of the elastomer is 0.1 g/10 minutes to 3.0 g/10 minutes.

Examples of the elastomer include polyolefin-based elastomers (e.g., polyethylene, polypropylene, ethylene-propylene copolymers, ethylene-propylene-α-olefin copolymers, ethylene-propylene-nonconjugated diene copolymers); aliphatic polyester elastomers (e.g., polyethylene succinate, polybutylene succinate, polybutylene succinate adipate, polybutylene succinate carbonate); acrylic acid-based elastomers, such as acrylic rubber, ethylene-acrylic acid copolymers and their alkali metal salts (so-called ionomers), ethylene-glycidyl methacrylate copolymers, and ethylene-alkyl acrylate ester copolymers; acid-modified ethylene-propylene copolymers, diene rubbers (for example, polybutadiene, polyisoprene, polychloroprene), and copolymers of diene and vinyl monomers (e.g., styrene-butadiene random copolymers, and styrene-butadiene-styrene block copolymers).

Examples of the α-olefin to be used for the ethylene-propylene-α-olefin copolymer include α-olefins having 4 to 20 carbon atoms. Examples of the α-olefins having 4 to 20 carbon atoms include straight chain α-olefins and branched α-olefins. Examples of the straight chain α-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nanodecene, and 1-eicosene. Examples of the branched α-olefins include 3-methyl-1-butene, 3-methyl-1-pentene, 4-methyl-1-pentene and 2-ethyl-1-hexene.

The method for producing the propylene-based resin composition of the present invention may be a method in which component (A), component (B), component (C), and additional components which are optionally incorporated are mixed by melt-kneading by a conventional method. The order of addition or the order of melt-kneading of the respective components in the melt-kneading is arbitrary. The kneading temperature is preferably 180 to 240° C.

Examples of the production method of a molded article of the propylene-based resin composition of the present invention include such molding methods as injection molding, extrusion forming, rotation molding, vacuum molding, foam molding, and blow molding. The propylene-based resin composition of the present invention is used for applications in industrial fields such as automobiles and household appliances because it is excellent in rigidity and heat resistance.

EXAMPLES

The present invention is described in detail below with reference to Examples. Evaluations of properties were performed by the following methods.

(1) Melt Flow Rate (MFR)

MFR was measured at a temperature of 230° C. and a load of 2.16 kgf in accordance with JIS K7210 (1995).

(2) Content of α,β-unsaturated glycidyl ester-derived structural units (unit: % by mass)

The content of α,β-unsaturated glycidyl ester-derived structural units in a modified propylene-based polymer was measured by a method including the following steps.

<1> A solution is prepared by dissolving 1.0 g of a sample in 10 ml of xylene.
<2> The solution is dropped into 300 ml of methanol under stirring, thereby reprecipitating a modified propylene-based resin.
<3> The reprecipitated modified propylene-based polymer is collected.
<4> The collected modified propylene-based polymer is vacuum dried (80° C., 8 hours).
<5> The dried modified propylene-based polymer is hot pressed to form a film of 100 μm in thickness.
<6> The infrared absorption spectrum of the film is measured and the content of α,β-unsaturated glycidyl ester-derived structural units is determined from the absorption of near 1730 $cm^{-1}$.

(3) Flexural Modulus (FM)

The flexural modulus of a specimen (3.2 mm in thickness) molded by injection molding was measured by a method provided in JIS K7203 at a bending load speed of 2.0 mm/min and a temperature of 23° C. The higher the flexural modulus, the higher the rigidity.

(4) Deflection Temperature Under Load (HDT)

The deflection temperature under load of a specimen (13 mm in width, 6.4 mm in thickness) molded by injection molding was measured by a method provided in JIS K7110 under a load of 0.45 MPa. The higher the deflection temperature under load, the higher the heat resistance.

The materials used in the Examples and Comparative Examples are as follows.

(A-1) "Noblen (registered trademark) AY161" produced by Sumitomo Chemical Co., Ltd. (Propylene-ethylene block copolymer, MFR=15 g/10 min, propylene-ethylene random copolymer component content=14% by mass, isotactic pentad fraction of propylene homopolymer component=0.975, intrinsic viscosity of propylene homopolymer component=1.3 dl/g, content of ethylene units in propylene-ethylene random copolymer component=37% by mass, intrinsic viscosity of propylene-ethylene random copolymer component=2.4 dl/g)

(A-2) "Noblen (registered trademark) X101" produced by Sumitomo Chemical Co., Ltd. (Propylene homopolymer, MFR=40 g/10 min, isotactic pentad fraction=0.975, intrinsic viscosity=1.25 dl/g, Mw/Mn=5)

(A-3) "Noblen (registered trademark) WPX5343" produced by Sumitomo Chemical Co., Ltd. (Propylene-ethylene block copolymer, MFR=55 g/10 min, propylene-ethylene random copolymer component content=12% by mass, isotactic pentad fraction of propylene homopolymer component=0.985, intrinsic viscosity of propylene homopolymer component=0.9 dl/g, content of ethylene units in propylene-ethylene random copolymer component=32% by mass, intrinsic viscosity of propylene-ethylene random copolymer component=6.0 dl/g)

(A-4) "Noblen (registered trademark) Y101" produced by Sumitomo Chemical Co., Ltd. (Propylene homopolymer, MFR=14 g/10 min, isotactic pentad fraction=0.975, intrinsic viscosity=1.45 dl/g, Mw/Mn=5)

(A-5) "Noblen (registered trademark) U501" produced by Sumitomo Chemical Co., Ltd. (Propylene homopolymer, MFR=120 g/10 min, isotactic pentad fraction=0.975, intrinsic viscosity=0.9 dl/g, Mw/Mn=5)

(A-6) "Noblen (registered trademark) AW630" produced by Sumitomo Chemical Co., Ltd. (Propylene-ethylene block copolymer, MFR=9 g/10 min, propylene-ethylene random copolymer component content=14% by mass, isotactic pentad fraction of propylene homopolymer component=0.975, intrinsic viscosity of propylene homopolymer component=1.4 dl/g, content of ethylene units in propylene-ethylene random copolymer component=37% by mass, intrinsic viscosity of propylene-ethylene random copolymer component=2.9 dl/g)

(A-7) "Noblen (registered trademark) AZ630" produced by Sumitomo Chemical Co., Ltd. (Propylene-ethylene block copolymer, MFR=30 g/10 min, propylene-ethylene random copolymer component content=16% by mass, isotactic pentad fraction of propylene homopolymer component=0.975, intrinsic viscosity of propylene homopolymer component=1.0 dl/g, content of ethylene units in propylene-ethylene random copolymer component=35% by mass, intrinsic viscosity of propylene-ethylene random copolymer component=5.0 dl/g)

(B-1) "TERRAMAC (registered trademark) TE-2000" produced by Unitika, Ltd. (Polylactic acid resin, MFR=40 g/10 min, weight average molecular weight=120,000, Mw/Mn=1.8)

(C-1) One hundred parts by mass of a propylene homopolymer produced by Sumitomo Chemical Co., Ltd. (MFR=0.5 g/10 min), 2 parts by mass of glycidyl methacrylate, 0.38 parts by mass of a radical generator "Perkadox 14/40C" produced by Kayaku Akzo Corp., 0.56 parts by mass of a radical generator "Perkadox24FL" produced by Kayaku Akzo Corp., and 2 parts by mass of styrene monomer were mixed at a time, and then a modified propylene-based polymer, a propylene homopolymer to which glycidyl methacrylate had been grafted, was produced by using a 50 mmϕ twin screw kneading extruder (TEM50 manufactured by Toshiba Machine Co., Ltd.) whose cylinder temperature was set at 180° C. in the upstream region, at 220° C. in the middle region, and at 260° C. in the downstream region, at an extrusion rate of 50 kg/hr and a screw rotation rate of 200 rpm. The content of the glycidyl methacrylate-derived structural units was 0.6% by mass, wherein the whole amount of the modified propylene-based polymer was 100% by mass.

(C-2) GMA-ethylene copolymer "BF-E" produced by Sumitomo Chemical Co., Ltd.

(D-1) Elastomer "Tuftec (registered trademark) H1062" produced by Asahi Chemical Co., Ltd. (Hydrogenated styrene-ethylene-butylene-styrene copolymer, MFR (190° C.)=0.5 g/10 min), styrene content=18%

(D-2) Elastomer "ENGAGE 8842" produced by The Dow Chemical Co. (Ethylene-octene copolymer, MFR (190° C.)=1.2 g/10 min)

(E-1) Talc "JR46" produced by Hayashi Kasei Co., Ltd. (Average particle diameter=2.7 μm)

Example 1

A propylene-ethylene block copolymer (A-1), a polylactic acid resin (B-1), a modified propylene-based polymer (C-1), an elastomer (D-1), and talc (E-1) in the amounts given in Table 1 were melt-kneaded by using a 50 mmϕ twin screw kneading extruder (TEM50 manufactured by Toshiba Machine Co., Ltd.) at a cylinder temperature of 190° C., an extrusion rate of 50 kg/hr and a screw rotation rate of 200 rpm, so that a resin composition was produced.

(Injection Molded Article)

The obtained resin composition was injection molded by using a Sycap 50 injection molding machine manufactured by Sumitomo Heavy Industries, Ltd., at a molding temperature of 200° C., a mold cooling temperature of 35° C., an injection time of 25 seconds, and a cooling time of 25 seconds. The flexural modulus and the deflection temperature under load of the resulting injection-molded articles were measured. The results are set forth in Table 1.

Example 2

A resin composition was produced by melt-kneading a propylene-ethylene block copolymer (A-1), a polylactic acid resin (B-1), a modified propylene-based polymer (C-1), an elastomer (D-1), and talc (E-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Example 3

A resin composition was produced by melt-kneading a propylene homopolymer (A-2), a propylene-ethylene block copolymer (A-3), a polylactic acid resin (B-1), and a modified propylene-based polymer (C-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Example 4

A resin composition was produced by melt-kneading a propylene homopolymer (A-2), a propylene-ethylene block copolymer (A-3), a polylactic acid resin (B-1), a modified propylene-based polymer (C-1), and an elastomer (D-2) in the amounts given in Table 1, under the same conditions as in Example 1. The obtained resin composition was injection molded under the same conditions as in Example 1, and the flexural modulus and the deflection temperature under load were measured. The results are set forth in Table 1.

Example 5

A resin composition was produced by melt-kneading a propylene homopolymer (A-4), a propylene-ethylene block copolymer (A-6), a polylactic acid resin (B-1), and a modified propylene-based polymer (C-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Example 6

A resin composition was produced by melt-kneading a propylene homopolymer (A-5), a propylene-ethylene block copolymer (A-7), a polylactic acid resin (B-1), and a modified propylene-based polymer (C-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Example 7

A resin composition was produced by melt-kneading a propylene homopolymer (A-4), a propylene-ethylene block copolymer (A-6), a polylactic acid resin (B-1), a modified propylene-based polymer (C-1), and an elastomer (D-2) in the amounts given in Table 1, under the same conditions as in Example 1. The obtained resin composition was injection molded under the same conditions as in Example 1, and the flexural modulus and the deflection temperature under load were measured. The results are set forth in Table 1.

Example 8

A resin composition was produced by melt-kneading a propylene homopolymer (A-5), a propylene-ethylene block copolymer (A-7), a polylactic acid resin (B-1), a modified propylene-based polymer (C-1), and an elastomer (D-2) in the amounts given in Table 1, under the same conditions as in Example 1. The obtained resin composition was injection molded under the same conditions as in Example 1, and the flexural modulus and the deflection temperature under load were measured. The results are set forth in Table 1.

Comparative Example 1

A resin composition was produced by melt-kneading a propylene-ethylene block copolymer (A-1), a polylactic acid resin (B-1), an elastomer (D-1), and talc (E-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Comparative Example 2

A resin composition was produced by melt-kneading a propylene-ethylene block copolymer (A-1), a polylactic acid resin (B-1), a modified propylene-based polymer (C-2), an elastomer (D-1), and talc (E-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Comparative Example 3

A resin composition was produced by melt-kneading a propylene-ethylene block copolymer (A-1), a polylactic acid resin (B-1), a modified propylene-based polymer (C-2), an elastomer (D-1), and talc (E-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Comparative Example 4

A resin composition was produced by melt-kneading a propylene-ethylene block copolymer (A-1), a polylactic acid resin (B-1), a modified propylene-based polymer (C-2), an elastomer (D-1), and talc (E-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Comparative Example 5

A resin composition was produced by melt-kneading a propylene homopolymer (A-2), a propylene-ethylene block copolymer (A-3), and a polylactic acid resin (B-1) in the amounts given in Table 1, under the same conditions as in Example 1. The obtained resin composition was injection molded under the same conditions as in Example 1, and the flexural modulus and the deflection temperature under load were measured. The results are set forth in Table 1.

Comparative Example 6

A resin composition was produced by melt-kneading a propylene homopolymer (A-2), a propylene-ethylene block copolymer (A-3), a polylactic acid resin (B-1), and an elastomer (D-2) in the amounts given in Table 1, under the same conditions as in Example 1. The obtained resin composition was injection molded under the same conditions as in Example 1, and the flexural modulus and the deflection temperature under load were measured. The results are set forth in Table 1.

INDUSTRIAL APPLICABILITY

According to the present invention, a propylene-based resin composition excellent in rigidity and heat resistance and a molded article thereof can be obtained.

TABLE 1

| | Examples | | | | | | | | Comparative Examples | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Component (% by mass) | | | | | | | | | | | | | | |
| A-1 | 45.5 | 41.7 | | | | | | | 50 | 47.6 | 45.5 | 41.7 | | |
| A-2 | | | 20 | 20 | | | | | | | | | 30 | 25 |
| A-3 | | | 40 | 40 | | | | | | | | | 40 | 45 |
| A-4 | | | | | 20 | | 20 | | | | | | | |
| A-5 | | | | | | 20 | | 20 | | | | | | |
| A-6 | | | | | 40 | | 40 | | | | | | | |
| A-7 | | | | | | 40 | | 40 | | | | | | |
| B-1 | 45.5 | 41.7 | 30 | 30 | 30 | 30 | 30 | 30 | 50 | 47.6 | 45.5 | 41.7 | 30 | 30 |

TABLE 1-continued

|  | Examples | | | | | | | | Comparative Examples | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 |
| C-1 | 9.0 | 16.6 | 10 | 10 | 10 | 10 | 10 | 10 |  |  |  |  |  |  |
| C-2 |  |  |  |  |  |  |  |  |  | 4.8 | 9.0 | 16.6 |  |  |
| Component (parts by mass) |  |  |  |  |  |  |  |  |  |  |  |  |  |  |
| D-1 | 9.0 | 8.3 |  |  |  |  |  |  | 10 | 9.5 | 9.0 | 8.3 |  |  |
| D-2 |  |  |  | 15 |  |  | 15 | 15 |  |  |  |  |  | 15 |
| E-1 | 9.0 | 8.3 |  |  |  |  |  |  | 10 | 9.5 | 9.0 | 8.3 |  |  |
| Physical property |  |  |  |  |  |  |  |  |  |  |  |  |  |  |
| MFR (g/10 min) | 20 | 13 | 40 | 28 | 20 | 44 | 14 | 26 | 54 | 22 | 14 | 7 | 77 | 37 |
| FM (MPa) | 2100 | 2070 | 2060 | 1490 | 2100 | 2030 | 1570 | 1600 | 2200 | 1670 | 1500 | 1170 | 1840 | 1350 |
| HDT (° C.) | 70 | 78 | 118 | 82 | 107 | 110 | 78 | 79 | 62 | 60 | 59 | 57 | 94 | 75 |

The invention claimed is:

1. A propylene-based resin composition comprising 10 to 89% by mass of a propylene-based polymer (A) (excluding a modified propylene-based polymer (C) defined below), 10 to 89% by mass of a polylactic acid-based resin (B), and 1 to 80% by mass of a modified propylene-based polymer (C) which is an α,β-unsaturated glycidyl ester-grafted propylene-based polymer having an α,β-unsaturated glycidyl ester-derived structural unit content of 0.1% by mass or more and less than 1.0% by mass, provided that each of the contents of the propylene-based polymer (A), the polylactic acid-based resin (B) and the modified propylene-based polymer (C) is an amount based on the total amount of the three components.

2. The propylene-based resin composition according to claim 1, wherein modified propylene-based polymer (C) is a propylene-based polymer grafted with glycidyl methacrylate.

3. A molded article comprising the propylene-based resin composition according to claim 1.

* * * * *